COMBINATION PHONOGRAPH RECORD AND PACKAGE

Filed March 15, 1960

Joseph Schulein
INVENTOR.

BY Ramsey and Kolisch
Attys.

3,009,707
COMBINATION PHONOGRAPH RECORD AND PACKAGE
Joseph Schulein, P.O. Box 212, Corvallis, Oreg.
Filed Mar. 15, 1960, Ser. No. 15,081
11 Claims. (Cl. 274—42)

This invention relates to a combination phonograph record and package therefor and more particularly a phonograph record having a flat disk body with a plurality of sound grooves thereon and an envelope for the record which has means for exposing for play only a portion of the sound grooves.

It is common practice for stores which sell phonograph records to permit potential customers to play records in order to determine whether or not they wish to make a purchase. These records are usually packaged in paper or plastic envelopes, one end of which is open to permit removal and replacement of a record. When records are handled or played, the sound grooves are frequently scratched, or otherwise damaged and, even if not damaged, they become worn. While it is highly desirable from a sales point of view to permit potential purchasers to listen to records, such practice poses a problem in producing unsalable mechandise. This is particularly troublesome in stereo-type records because they have very fine sound grooves. Consequently, record stores have found themselves in a dilemma and the only answer some stores have found is to prohibit trial playing of records, which is an admittedly poor solution of the problem.

According to the present invention, the problem is solved by placing a record in a sealed envelope which covers and protects all of the sound grooves except a selected portion thereof which is free to be played for testing purposes. These selected portions of the grooves may be representative of the whole composition and enable one to determine whether or not be desires to purchase the record. Thus the main portion of the sound grooves are not subject to wear, scratching, or other damage.

The invention will now be described in greater detail with reference to the drawings, in which.

Figures 1, 2:
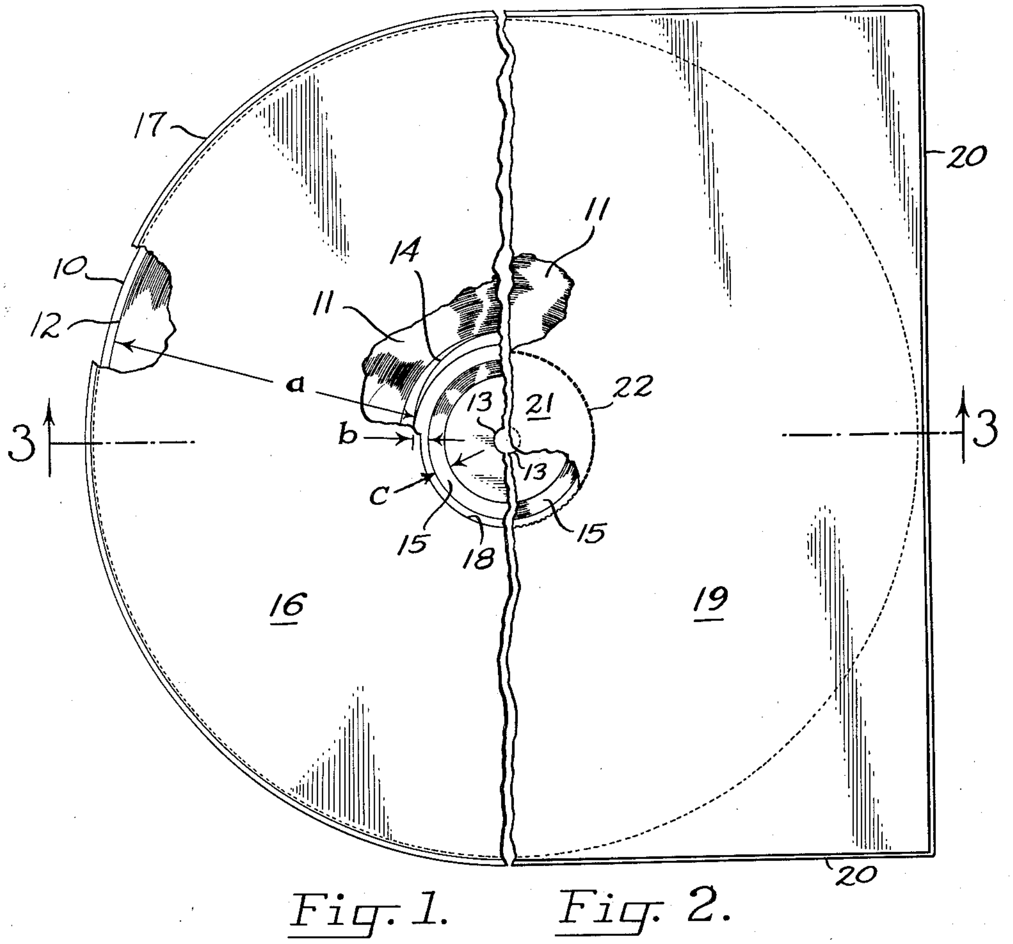
FIG. 1 is a top plan view of a portion of an envelope and record according to the invention.
FIG. 2 is a top plan view of another embodiment of an envelope and record according to the invention.

Phonograph record 10 has a flat body on whose opposite sides a plurality of spiral sound grooves 11 have been formed. Grooves 11 extend over a major portion of a side of the record, designated *a*, which commences near the peripheral edge 12 of the record and continues towards an axial center hole 13 adapted to receive a spindle of a phonograph (not shown). When the record is placed on the turntable of a phonograph, the record may be rotated for sound-reproducing purposes. Grooves 11 terminate in replay groove 14 which imparts an eccentric motion to the phonograph playing arm (not shown), whereby when it reaches the end of the grooves the arm is returned to a replay position.

A second set of spiral sound grooves 15 is positioned between the end of grooves 11 (groove 14) and hole 13 in the area designated *c*. Between grooves 11 and 15 a blank space *b* is provided. Grooves 15 are substantially fewer than grooves 11 and are by way of a sample of the sounds to be heard on grooves 11. This sample may take any convenient form, such as grooves 15 being recordings of representative sounds from grooves 11. If, for instance, grooves 11 are a complete, conventional musical composition, grooves 15 could be the theme of the musical composition on grooves 11.

A circular envelope 16 of any suitable material, such as paper or plastic of the type presently employed for record envelopes, encompasses and covers both sides of the record and is sealed to itself about its periphery, as at 17, all around the record. A cutout portion or center aperture 18 is provided in envelope 16, which aperture registers with center hole 13, and grooves 15 completely around the record (so that complete turns of the spiral grooves are exposed). The aperture does not extend over any portion of grooves 11, so that those grooves remain covered as long as the record is in the envelope.

Figure 3:
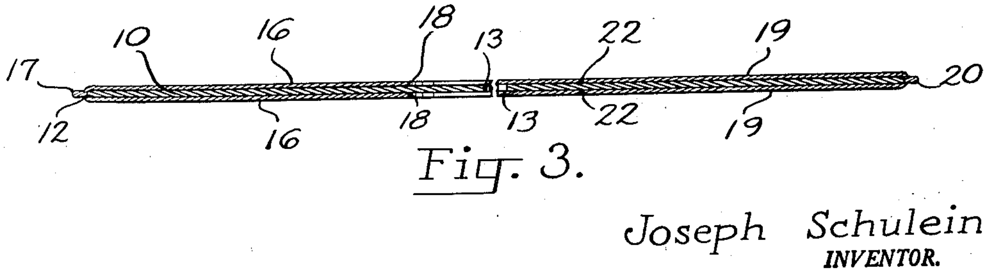
FIG. 3 is a section along the lines 3—3 of FIGS. 1 and 2.

The embodiment of the envelope shown in FIG. 2 is a rectangularly shaped envelope 19, which is also sealed at its edges 20, FIG. 3. The center area of envelope 19, which corresponds to center aperture 18 of envelope 16, may be covered with a removable center portion 21 which is connected to the rest of the body of envelope 19 by a perforated circular line 22. Portion 21 may be conveniently torn out and the envelope with then have a center aperture which corresponds to aperture 18 of envelope 16. The provision of an envelope with a removable center aperture may be desirable in the shipment of records to stores. Envelope 16, if desired, could also be provided with a removable center portion.

The peripheries of the envelopes in both of the abovementioned embodiments are positioned closely adjacent to the peripheral edges of the records so as to assure that the record and envelope will rotate freely and as one on a phonograph turntable.

The material from which any envelope according to the invention is made, should be sufficiently rigid so as to prevent removal of a record from the envelope via the center aperture without destruction or tearing of the envelope. The envelope should be sealed or closed at its edges in any suitable manner, such as gluing, stapling, or heat welding in the case of certain plastics.

It will be appreciated that according to the invention a potential purchaser of a record in a store will be able to play the sample grooves to determine whether he wishes to buy the record. If he purchases the record and wishes to play it, he will simply open the envelope to permit removal of the record in the usual manner. The purchaser of a record will in this way be assured that the main recording on a record he buys is in factory-perfect condition and the proprietor of a record store will, by the same token, be protected from damaged records.

While there have been described preferred embodiments of the invention, it is to be understood that the invention may be practiced in other ways, and it is intended to limit the invention only by the appended claims.

It is claimed and desired to secure as Letters Patent:

1. In combination with a phonograph record having a flat disk body, a plurality of helical sound grooves formed on at least one side of said body, an envelope with opposed sides containing the record and with the sides of the envelope extending over the sides of the record body and the record body within the envelope, and an aperture in said envelope exposing only a portion of said sound grooves with said portion of grooves extending completely about the record whereby only the exposed portion of said grooves may be played on a phonograph while the envelope remains intact on the record.

2. In combination with a phonograph record having a flat disk body and a center axially extending hole formed in said body adapted to receive a phonograph spindle, a plurality of helical sound grooves formed on a side of said body, an envelope with opposed sides containing the record and with the sides of the envelope over the sides of the record body and the record body within the envelope, and an aperture in said envelope exposing said center hole of the record and only a portion of said sound grooves adjacent to said center hole with said portion extending completely about the record, said envelope covering all the remainder of said sound grooves and enabling the playing of only said portion of said grooves on a phonograph without removing the record from the envelope.

3. The combination of claim 2 wherein said envelope is made of flexible material and sealed about the periphery of said record.

4. In combination with a phonograph record having a flat disk body and a center axially extending hole formed in said body adapted to receive a phonograph spindle, a first set of spiral sound grooves formed on a side of said body spaced radially outwardly of said hole, a second set of spiral sound grooves formed on the same side of said body between the center hole and the last groove of the first set, said second set of grooves being constructed to reproduce the sounds produced by a portion of said first set of grooves, an envelope with opposed sides containing the record, said envelope covering the first set of grooves, and a center aperture in said envelope exposing only the center hole of the record and the second set of grooves completely around the record.

5. The combination of claim 4 wherein the second set of grooves is separated from the first set of grooves by a flat-surfaced portion of the disk body.

6. The combination of claim 4 wherein said envelope is made of flexible material and sealed about the periphery of said record.

7. In combination with a phonograph record having a flat disk body and having a center axially extending hole adapted to receive a phonograph spindle, a first set of spiral sound grooves formed on a side of said body starting adjacent to its peripheral edge and extending over a major portion of the record side towards the center hole, a second set of spiral sound grooves on the same side of the record as the first set and positioned intermediate the innermost groove of said first set and the center hole, a flat-surfaced portion of the record body separating the first and second sets of grooves, the second set having substantially fewer grooves than the first set and being constructed like a portion of the grooves of the first set so that the sounds reproduced are the same; an envelope of flexible material containing the record, said envelope being closed on all sides and having a center aperture registering only with a central portion of said sides of the record and exposing said second set of sound grooves completely around the record and said center hole while covering said first set of grooves whereby while the record remains in the envelope only the second set of sound grooves may be played on a phonograph.

8. The combination according to claim 7 in which said first and second sets of sound grooves are formed on both sides of the record and said envelope has apertures on both its sides exposing both of the second sets of grooves.

9. The combination according to claim 8 and in which the envelope is circularly shaped.

10. The combination recording to claim 8 and in which the envelope is rectangularly shaped.

11. In combination with a phonograph record having a flat disk body and having a center axially extending hole adapted to receive a phonograph spindle, a first set of spiral sound grooves formed on one side of the disk body spaced radially outwardly of the center hole, a second set of spiral sound grooves formed on the same side of the disk body between the center hole and the last groove of the first set, said second set of grooves being constructed like a portion of the grooves of the first set so that the sounds reproduced by the two are the same, a closed envelope containing the record, the center portion of the envelope being removable to expose the center hole of the record and the second set of grooves completely around the record whereby while the record remains in the envelope only the second set of grooves may be played on a phonograph.

References Cited in the file of this patent

UNITED STATES PATENTS

| | | |
|---|---|---|
| 786,347 | Darby | Apr. 4, 1905 |
| 870,961 | Hoffman | Nov. 12, 1907 |
| 1,449,433 | Manson | Mar. 27, 1923 |
| 1,468,879 | Emerson | Sept. 25, 1923 |
| 1,792,528 | Bleyer | Feb. 17, 1931 |
| 2,306,726 | Hasin | Dec. 29, 1942 |